United States Patent
Olgiati

(10) Patent No.: US 10,310,889 B1
(45) Date of Patent: Jun. 4, 2019

(54) DATA STATISTICS SERVICE

(71) Applicant: Amazon Technologies, Inc., Seattle, WA (US)

(72) Inventor: Andrea Olgiati, Gilroy, CA (US)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 15/184,824

(22) Filed: Jun. 16, 2016

(51) Int. Cl.
  *G06F 15/173* (2006.01)
  *G06F 9/48* (2006.01)
  *G06F 17/18* (2006.01)
  *G06F 9/54* (2006.01)

(52) U.S. Cl.
  CPC ............. *G06F 9/48* (2013.01); *G06F 9/54* (2013.01); *G06F 17/18* (2013.01)

(58) Field of Classification Search
  CPC ... H04L 64/10; H04L 64/101; H04L 64/1002; H04L 64/1006; H04L 64/1008; H04L 64/1012; H04L 64/1023; H04L 64/1029; H04L 61/1523
  USPC .......................... 709/200, 209, 224, 226, 249
  See application file for complete search history.

(56) References Cited

U.S. PATENT DOCUMENTS

| | | | | |
|---|---|---|---|---|
| 2010/0281482 A1* | 11/2010 | Pike | ............... | G06F 9/44505 718/102 |
| 2011/0264805 A1* | 10/2011 | Breitgand | ........... | G06F 9/45558 709/226 |
| 2012/0266164 A1* | 10/2012 | Anderson, III | ....... | G06F 9/5077 718/1 |
| 2013/0007272 A1* | 1/2013 | Breitgand | ............. | G06F 9/5077 709/224 |
| 2013/0198564 A1* | 8/2013 | Hasit | ................ | G06F 17/30079 714/16 |

* cited by examiner

*Primary Examiner* — Farzana B Huq
(74) *Attorney, Agent, or Firm* — Lee & Hayes, P.C.

(57) ABSTRACT

A data statistics service provides functionality for asynchronously generating statistical information, such as data distributions, for sets of data. The statistical information can be generated asynchronously using computing resources, such as virtual machine (VM) instances, that are selected based upon availability. Processing agents executing on the VM instances can be started and stopped at will, also based upon the availability of the computing resources. An application programming interface (API) can be exposed to enable other network services to access the statistical information, to provide statistical information, and to provide access metadata describing the frequency of access to the data or patterns of access to the data. The access metadata can be utilized to focus the processing performed by the processing agents on particular sets of data.

17 Claims, 10 Drawing Sheets

GENERATING STATISTICAL INFORMATION FOR RANGES OF DATA

DATA STATISTICS SERVICE

BACKGROUND

Certain types of network services, database services for example, compute various types of internal data structures when data is first ingested for processing. For instance, a database service might compute statistical information for data that is to be added to a database. This data can be utilized to optimize searching of the data and/or for other purposes.

It can be desirable in some installations to query the same data using multiple different network services. In these instances, each of the network services will typically ingest the same data. As a part of the ingestion process, each of the network services might also independently compute the same statistical information for the data. The duplicate computation of the same statistical data in this manner can result in wasted use of computing resources, particularly where very large data sets are ingested.

The disclosure made herein is presented with respect to these and other considerations.

DETAILED DESCRIPTION

Figure 1:
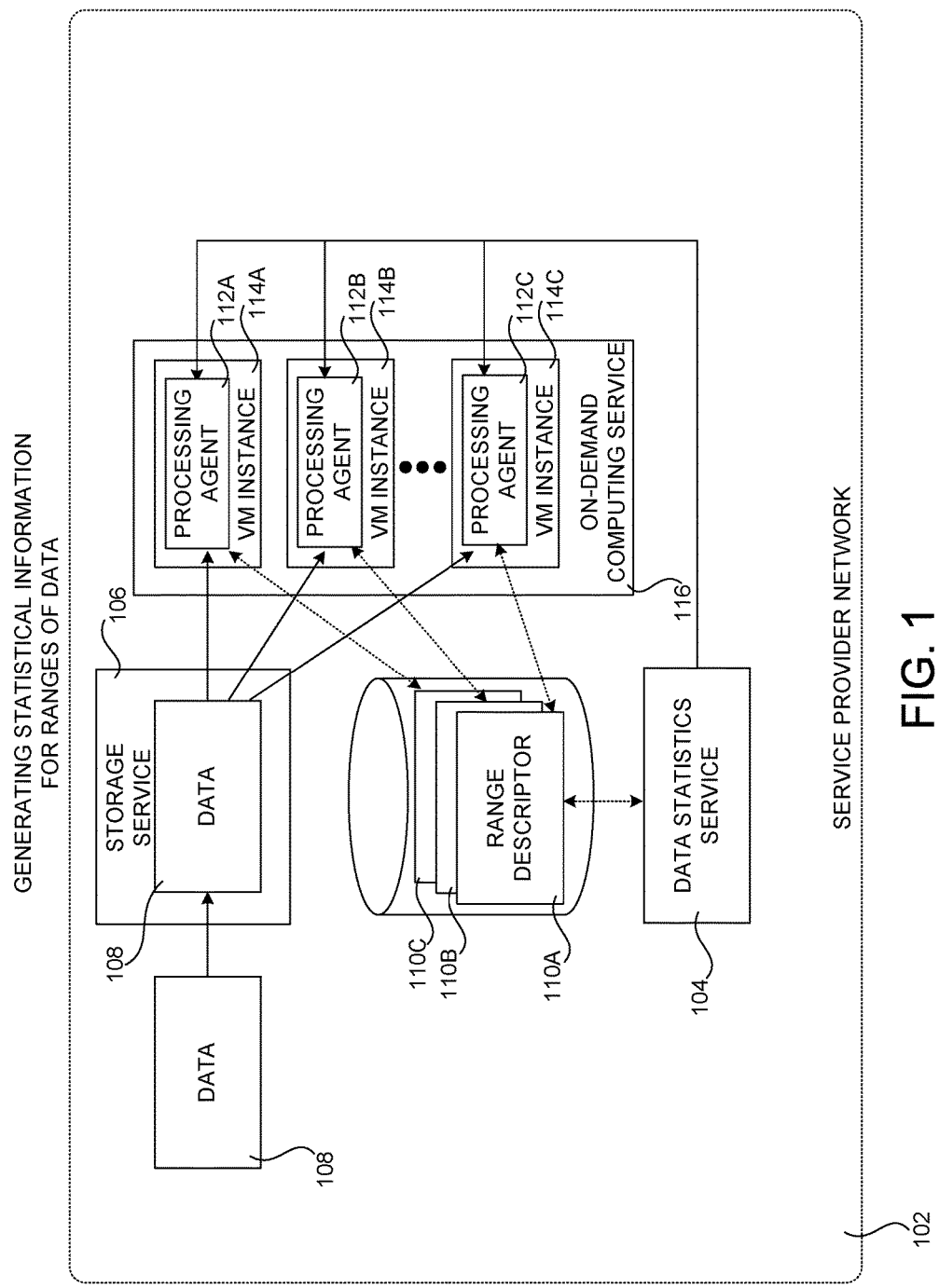
FIG. 1 is a system architecture diagram showing aspects of the configuration and operation of a data statistics service configured to utilize processing agents to asynchronously compute statistical information for sets of data, according to one configuration disclosed herein.

The following detailed description is directed to technologies for providing a data statistics service. The data statistics service is a network service that provides functionality for asynchronously generating statistical information, such as data distributions, for sets of data. The statistical information can be generated asynchronously using computing resources, such as virtual machine ("VM") instances executing in a service provider network, that are selected based upon availability. Processing agents executing on the VM instances can be started and stopped at will, also based upon the availability of the computing resources.

A network services application programming interface ("API") can also be exposed to enable other network services to access the statistical information, to provide statistical information, and to provide access metadata describing the frequency of access to the data or patterns of access to the data. The access metadata can be utilized to focus the processing performed by the processing agents on particular portions of the data. In this way, the data statistics service can reduce the amount of duplicate effort currently performed by network services in the generation of statistical information. Additional technical benefits other than those described briefly above can also be realized through an implementation of the technologies disclosed herein.

The data statistics service can execute in a service provider network that is configured to provide computing resources on a permanent or an as-needed basis. Among other types of functionality, the computing resources provided by the service provider network can be utilized to implement the various network services described herein. The computing resources provided by the service provider network can include various types of computing resources, such as data processing resources like the VM instances mentioned above, data storage resources, networking resources, data communication resources, network services, and the like. Additional details regarding the various components and processes described briefly above for providing a data statistics service will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a system architecture diagram showing aspects of the configuration and operation of a service provider network 102 and a data statistics service 104 configured to execute therein. As discussed briefly above, the service provider network 102 is a computing network configured to provide computing resources on a permanent or an as-needed basis. Among other types of functionality, the computing resources provided by the service provider network 102 can be utilized to implement the various network services described herein, such as the data statistics service 104. The computing resources provided by the service provider network 102 can include various types of computing resources, such as data processing resources like VM instances, data storage resources, networking resources, data communication resources, network services, and the like.

A customer or potential customer of the service provider network 102 can utilize an appropriate computing system (not shown in FIG. 1) to communicate with the service provider network 102 over an appropriate data communications network (also not shown in FIG. 1). In this way, a customer of the service provider network 102 can configure various aspects of the operation of the computing resources provided by the service provider network 102, or to otherwise control any computing resources being utilized by the customer.

For example, and without limitation, a computing system utilized by a customer of the service provider network 102 can be utilized to purchase computing resources in the service provider network 102, to configure aspects of the operation of the computing resources through a management console (not shown in FIG. 1) or another type of interface, to access and utilize functionality provided by the various services and systems described herein, and/or to perform other types of functionality with regard to the operation of the computing resources provided by the service provider network 102. Additional details regarding the configuration and operation of the service provider network 102 will be provided below with regard to FIGS. 6-9.

As discussed briefly above, the service provider network 102 can also be configured to execute various types of network services. For example, and without limitation, the service provider network 102 can execute the data statistics service 104 shown in FIG. 1. The data statistics service 104 provides functionality for asynchronously generating statistical information, such as data distributions, for sets of data. As shown in FIG. 1, the statistical information can be generated asynchronously using computing resources, such as VM instances 114 or hardware computing devices, operating in the service provider network 102 that are selected based upon availability. Processing agents 112 executing on the VM instances 114 can be started and stopped at will, also based upon the availability of the computing resources. Additional details regarding these aspects are provided below.

As shown in FIG. 1, data 108 can be stored in a storage service 106 provided by the service provider network 102. As discussed in greater detail below with regard to FIG. 8, the storage service 106 can include software and computing resources that collectively operate to store data, such as the data 108, using block or file-level storage devices and/or virtualizations thereof. The data 108 stored in the storage service 106 can be tabular data organized in rows and columns. For example, and without limitation, the data 108 can be data arranged in a comma separated values ("CSV") file. Other types of file formats for organizing tabular data can also be utilized in other configurations.

In one configuration, the data statistics service 104 (or another service) is configured to monitor a storage location provided by the storage service 106 to determine when the data 108 has been stored therein. If the data statistics service 104 (or another service) determines that the data 108 has been stored therein, the data statistics service 104 creates range descriptors 110 for the data 108. In the example shown in FIG. 1, for instance, the data statistics service 104 has created three range descriptors 110A-110C (which might be referred to herein as the "range descriptors 110" or a "range descriptor 110") for the data 108.

The range descriptors 110 define sets of the data 108 that are to be processed by processing agents 112, which execute in an on-demand computing service 116 provided by the service provider network 102 in one particular configuration. The on-demand computing service 116 can be a collection of computing resources configured to instantiate VM instances 114 and, potentially, to provide other types of computing resources 704 on demand. Additional details regarding the configuration and operation of the on-demand computing service 116 will be provided below with regard to FIG. 8.

Figure 2:
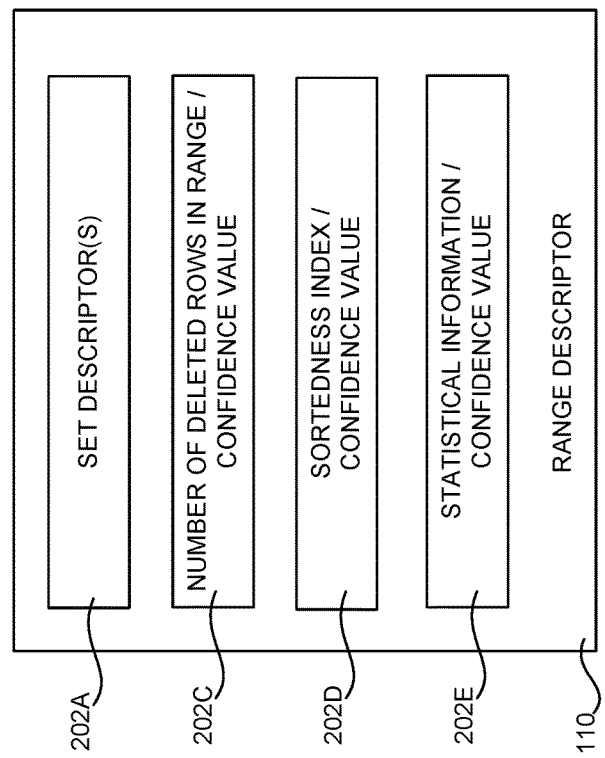
FIG. 2 is a data structure diagram showing the configuration of an illustrative range descriptor utilized by the data statistics service shown in FIG. 1 to compute and store statistical information for sets of data, according to one configuration.

Turning momentarily to FIG. 2, aspects of an illustrative range descriptor 110 that is utilized by the data statistics service 104 shown in FIG. 1 to compute and store statistical information for sets of data will be described. As shown in FIG. 2, a range descriptor 110 is a data structure that summarizes some of the properties of a set of the data 108. For example, and without limitation, when the data 108 is tabular data containing rows and columns, a range descriptor can summarize properties of a set of columns over rows of the data 108. In one configuration, the range descriptor 110 includes the fields 202A and 202C-202E shown in FIG. 1. Additional or alternate fields 202 can be utilized in other configurations.

The field 202A of the range descriptor 110 specifies a set of the data 108. For example, and without limitation, when the data 108 is expressed as tabular data having rows and columns, the field 202A can be utilized to store data describing a set of the rows of the data 108. The set of the rows can be contiguous or non-contiguous. For example, when a contiguous set of rows of the data 108 is to be defined, the field 202A can specify the first row in a range of the data 108 and the last row in the range. When a non-contiguous set of rows of the data 108 is defined, the field 202A might store data indicating that even or odd rows of the data 108 are to be included in the set or that a modulo function or another type of function is to be utilized to define the rows in the set. Non-contiguous sets of rows of the data 108 can be specified in the field 202A in other ways in other configurations.

The field 202C stores data describing the number of deleted rows in the set of the data 108 defined by the fields 202A. In some configurations, the field 202C also stores a confidence value. The confidence value describes the degree of approximation of the number of deleted rows specified by the field 202C.

The field 202D stores data describing how sorted (i.e. the "sortedness") the data in the set of the data 108 defined by the fields 202A is. The sortedness of the set can be expressed as a number between 0 and 1, where 1 indicates the set is fully sorted and 0 indicates the set is fully unsorted. In some configurations, the field 202D also stores a confidence value associated with the expressed sortedness of the set. This confidence value describes the degree of approximation of the sortedness of the set as specified by the field 202D.

For example, if it is known for certain that the set of rows defined by a range descriptor 110 has been fully sorted, it can be stated with confidence that set is sorted and, accordingly, the confidence value will be 1. As another example, if data 108 is loaded for which no information regarding its sortedness is known, a range descriptor 110 can be created for the data 108 and the confidence value for its sortedness will be set to 0. However, the data 108 might actually be fully sorted and, as a result, this estimate might be incorrect. As the actual sortedness of the data 108 is discovered, the confidence value for its sortedness can be set to higher values in the range descriptor 110. The fields 202C and/or 202D can be omitted from the range descriptor 110 in some configurations.

The field 202E stores statistical information for the set of the data 108 defined by the field 202A. Examples of the kind of statistical information that can be stored in the field 202E include, but are not limited to, minimum or maximum values for data 108 in the set defined by the fields 202A, a histogram for data 108 in the set defined by the field 202A, or a Bloom filter for data 108 in the set defined by the field 202A.

The field 202E can also store a "Count Distinct" indicating the number of distinct values there are in a set of the data 108. For instance, given a set containing (4,3,2,4,3,1,6) the Count Distinct is 5 (i.e. there are 5 unique values). The field 202E can also store a HyperLogLog, which is an approximate CD (see above) suitable for very large sets.

The field 202E can also store other types of statistical information including, but not limited to, median, mean, standard deviation, and higher order moments. Other types of statistical information can also be computed and stored in the field 202E. Multiple instances of the field 202E can also be included in a single range descriptor 110. The statistical information stored in the field 202E can also have an associated confidence value, also expressed as a numeral between 0 and 1 in one configuration.

It is to be appreciated that, in some configurations, a series of range descriptors 110 can be stored as an ordered list such that the set covered by each range descriptor 110 is contiguous to the previous range descriptor 110 and the next range descriptor 110. If there are too many range descriptors to make O(n) traversal of the range descriptors 110 infeasible, the range descriptors 110 can be ordered in a tree-like structure. It is also to be appreciated that any table of data can be initially described by a range descriptor 110 that declares the table to be unsorted with low confidence and with an unknown number of deleted rows. This type of range descriptor 110 might be referred to herein as a "default" range descriptor 110.

It is also to be appreciated that various types of operations can be performed on the range descriptors 110. For example, and without limitation, range descriptors 110 can be merged or split. As an example, range descriptors 110 for sets of the data 108 can be combined recursively until a single range descriptor 110 has been created for all of the data 108. Additionally, compaction operations can be performed on the range descriptors 110. Other types of operations might also be performed on the range descriptors 110. As will be described in greater detail below, the range descriptors 110, or information contained in the range descriptors 110, can be provided to other network services executing in the service provider network 102 for use in query optimization, compaction, and/or ordering of the data 108.

Referring back to FIG. 1, additional details regarding the operation of the data statistics service 104 will be provided. As discussed briefly above, when the data statistics service 104 detects that data 108 has been stored in the storage service 106, it can create range descriptors 110 (e.g. default range descriptors) for the new data 108. The number of range descriptors 110 created can vary based upon a number of considerations including, but not limited to, the number of rows in the data 108, the number of VM instances 114 or other hardware computing resources that will process the data 108, the computing capacity of the VM instances 114 or hardware computing resources, and/or other considerations.

In one example, for instance, if the data 108 includes 30,000 rows and each of the three VM instances 114A-114C is to generate statistical information for 10,000 rows, three default range descriptors 110A, 110B, and 110C can be created for the data 108. The range descriptor 110A corresponds to rows 1-10,000 of the data 108, the range descriptor 110B corresponds to rows 10,001 to 20,000 of the data 108, and the range descriptor 110C corresponds to rows 20,001 to 30,000 of the data 108. As discussed above, the fields 202 of the created range descriptors 110 can be populated with default values (e.g. values indicating that the data 108 is unsorted and that no rows are deleted, with low confidence values).

Once the range descriptors 110 have been created, processing of the data 108 to generate the statistical information, and other data, stored in the range descriptors 110 can begin. In order to perform this processing, the data statistics service 104 determines whether computing resources are available to begin processing of the sets of data 108 defined by the range descriptors 110 in order to generate the statistical information 202E. For example, and without limitation, the data statistics service 104 can communicate with the on-demand computing service 116 or the VM instances 114 executing therein to determine whether computing resources are available for use in generating the statistical information 202E.

In the example shown in FIG. 1, for instance, three VM instances 114A-114C have been instantiated in order to generate the statistical information 202E for the data 108. A processing agent 112 is installed and executed in each of the VM instances 114. The processing agent 112 is a software component that is configured to interact with the data statistics service 104 to obtain a range descriptor 110 for the data 108, and to compute the various values stored therein for the assigned set of the data 108. For instance, in the example shown in FIG. 1, the data statistics service 104 has assigned the range descriptor 110C to the processing agent 112A executing on the VM instance 114A, has assigned the range descriptor 110B to the processing agent 112B executing on the VM instance 114B, and has assigned the range descriptor 110A to the processing agent 112C executing on the VM instance 114C.

Using the example set forth above, for instance, the processing agent 112C is responsible for generating values in the range descriptor 110A for lines 1-10,000 of the data 108, the processing agent 112B is responsible for generating values in the range descriptor 110B for lines 10,001 to 20,000 of the data 108, and the processing agent 112A is responsible for generating values in the range descriptor 110C for lines 20,001 to 30,000 of the data 108. In this regard, it is to be appreciated that the data 108 can have many more rows and that many more range descriptors 110 and processing agents 112 can be utilized than illustrated in FIG. 1.

If computing resources are available for processing the data 108, the data statistics service 104 can instruct each of the processing agents 112 to begin processing the set of data 108 specified by their respective range descriptors 110. In response thereto, the processing agents 112 process the sets of the data 108 to generate the statistical information and, potentially other information (e.g. the sortedness value), contained in the range descriptor 110. The processing agents 112 can begin by computing this information to a certain confidence level. As the processing agents 112 perform their processing, they can store the results of their processing back into their assigned range descriptors 110. In this manner, the processing agents 112 can compute the statistical information 202E at a lower confidence level at first, and later compute the statistical information 202E at a higher confidence level. At any point in time, the statistical information 202E can be provided to calling network services in the manner described below with regard to FIGS. 4 and 5.

During the generation of the statistical information 202E, the data statistics service 104 can determine if processing capacity is still available from the VM instances 114 for generating the statistical information 202E. For example, the VM instances 114 might be needed in order to perform other computing tasks and, therefore, become unavailable for further processing of the data 108 at a certain point in time. The VM instances 114 might become unavailable for other reasons including, but not limited to, the price for use of the VM instances 114 exceeding a certain value, a customer of the service provider network 102 not having paid for use of the VM instances 114, and/or for other reasons.

If the VM instances 114 become unavailable, the data statistics service 104 can transmit an instruction to the processing agents 112 instructing them to stop the processing of the data 108. Processing can be resumed at a later time when processing capacity again becomes available from the VM instances 114. In this manner, the computation of the statistical information 202E can be performed to a certain confidence level. Processing of the statistical information 202E can then be paused until a future point in time. Processing of the statistical information 202E can then resume and be performed to a higher level of confidence. Processing of the statistical information 202E in this manner can be discontinued once the statistical information 202E has been generated to a desired level of confidence. Additional details regarding this process are provided below with regard to FIGS. 3A and 3B.

Figure 3A:
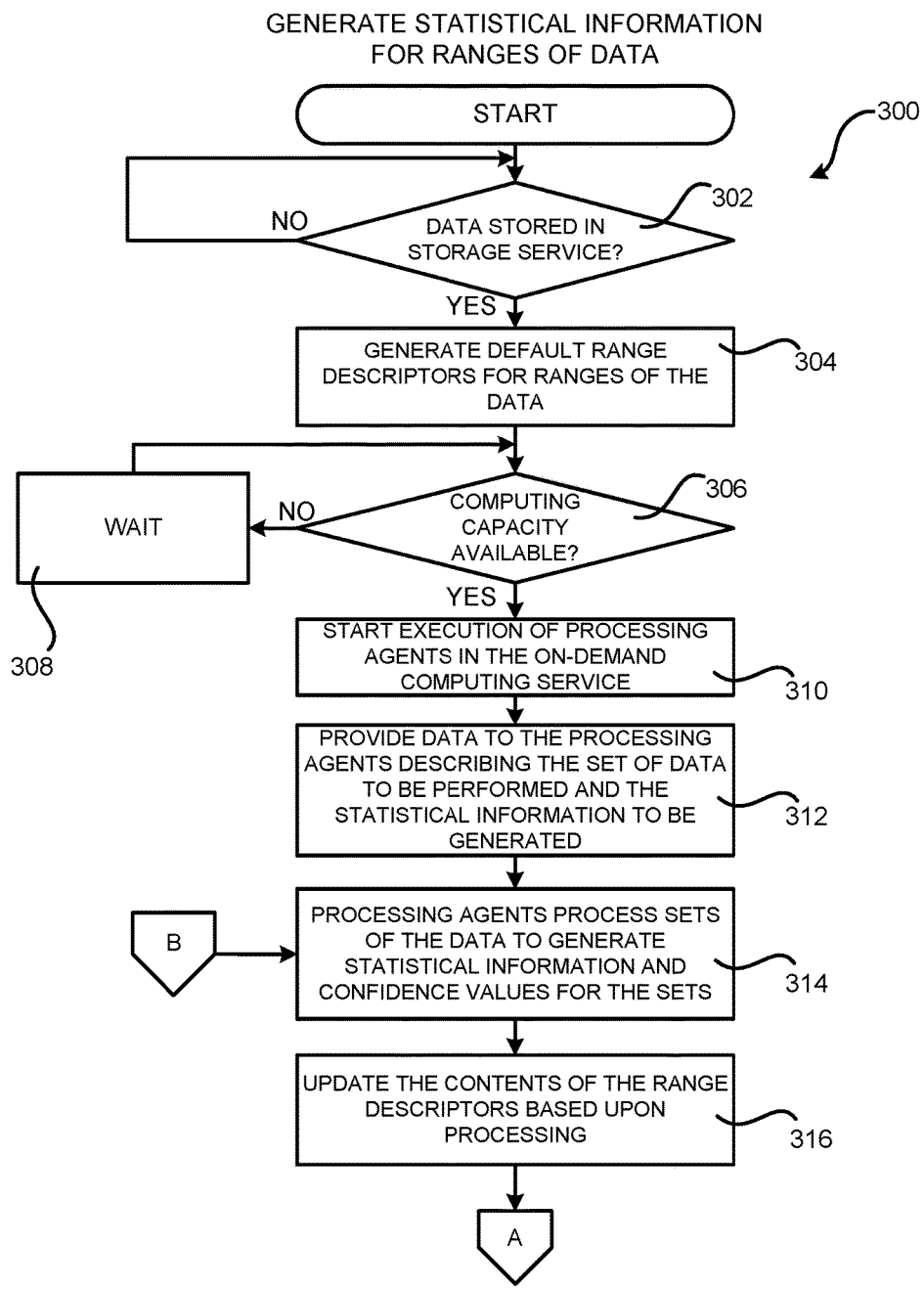
FIGS. 3A and 3B are flow diagrams showing a routine that illustrates further aspects of the operation of the data statistics service shown in FIG. 1 for asynchronously computing statistical information for sets of data, according to one particular configuration disclosed herein.
Figure 3B:
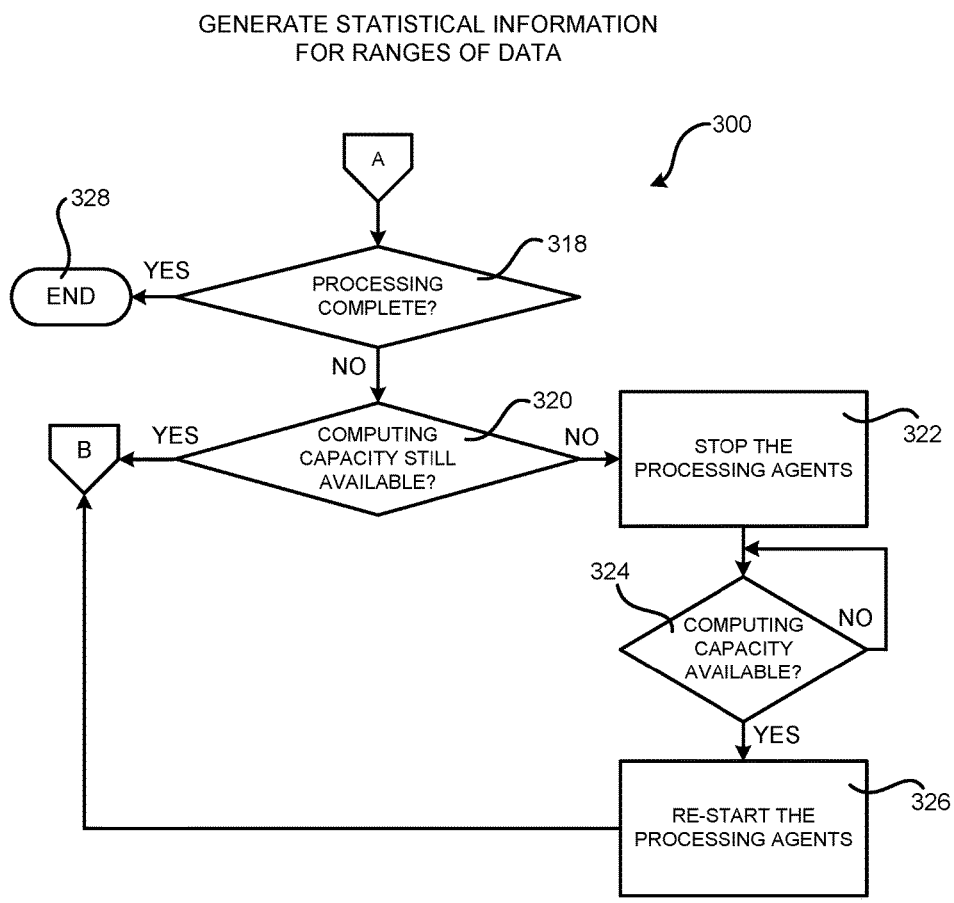

FIGS. 3A and 3B are flow diagrams showing a routine 300 that illustrates further aspects of the operation of the data statistics service 104 shown in FIG. 1 for asynchronously computing statistical information 202E for sets of the data 108, according to one particular configuration disclosed herein. It should be appreciated that the logical operations described herein with respect to FIGS. 3A and 3B, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 300 begins at operation 302, where the data statistics service 104 (or another service) determines whether data 108 has been stored at a location in the storage service 106. If data 108 has been stored in the storage service 106, the routine 300 proceeds from operation 302 to operation 304, where the data statistics service 104 generates default range descriptors 110 for the stored data 108. The routine 300 then proceeds from operation 304 to operation 306.

At operation 306, the data statistics service 104 determines whether computing capacity is available to begin processing of the data 108 to generate the values stored in the range descriptors 110. If no computing capacity is currently available, the routine 300 proceeds from operation 306 to operation 308, where the data statistics service 104 waits for a period of time before again checking to determine whether computing capacity is available for the generation of the statistical information 202E for the data 108. If, however, computing capacity (e.g. the VM instances 114 are available for processing the data 108), the routine 300 proceeds from operation 306 to operation 310.

At operation 310, the data statistics service 104 begins execution of the processing agents 112 in the on-demand computing service 116. The routine 300 then proceeds to operation 312, where the data statistics service 104 provides the range descriptors 110 to the processing agents 112. In the example shown in FIG. 1, for instance, the range descriptor 110A is provided to the processing agent 112C, the range descriptor 110B is provided to the processing agent 112B, and the range descriptor 112A is provided to the processing agent 112A. In other configurations, the range descriptors 112 are not provided to the processing agents 112. Rather, instructions are provided to the processing agents 112 defining the set of the data 108 that is to be processed and the type of statistical information that is to be generated. Other configurations can also be utilized.

From operation 312, the routine 300 proceeds to operation 314, where the processing agents 112 process sets of the data 108 defined by their respective range descriptors 110. The processing agents 112 generate the statistical information 202E and associated confidence values. This information can then be stored in the respective range descriptors 110. This occurs at operation 316. The routine 300 then continues from operation 316 to operation 318, shown in FIG. 3B.

At operation 318, the data statistics service 104 determines whether processing of the data 108 is complete. For example, and without limitation, the data statistics service 104 might examine the range descriptors 110 to determine whether the statistical information 202E has been computed to a desired confidence level. If processing has completed, the processing agents 112 can be stopped. The routine 300 then proceeds from operation 318 to operation 328, where it ends. If processing of the data 108 has not completed, the routine 300 proceeds from operation 318 to operation 320.

At operation 320, the data statistics service 104 determines whether computing capacity is still available for computing the statistical information 202E. For example, and without limitation, the data statistics service 104 can determine whether the VM instances 114 are still available for use in processing the data 108. If the computing resources are still available, the routine 300 proceeds back to operation 314, where processing of the data 108 can continue in the manner described above. If, however, computing resources are not available for processing the data 108, the routine 300 proceeds from operation 320 to operation 322.

At operation 322, the data statistics service 104 instructs the processing agents 112 to stop processing the data 108. The routine 300 then proceeds to operation 324, where the data statistics service 104 can determine whether computing capacity has once again become available for processing the data 108. For example, the data statistics service 104 can determine whether the VM instances 114 have once again become available for use by the processing agents 112.

If computing capacity has become available for continued processing of the data 108, the routine 300 proceeds to operation 326, where the data statistics service 104 can restart the processing of the data 108. For instance, and without limitation, the data statistics service 104 can transmit an instruction to the processing agents 112 to resume generation of the statistical information 202E for the sets of the data 108 specified in their respective range descriptors 110. The routine 300 then proceeds from operation 326 to operation 314, described above.

Figure 4:
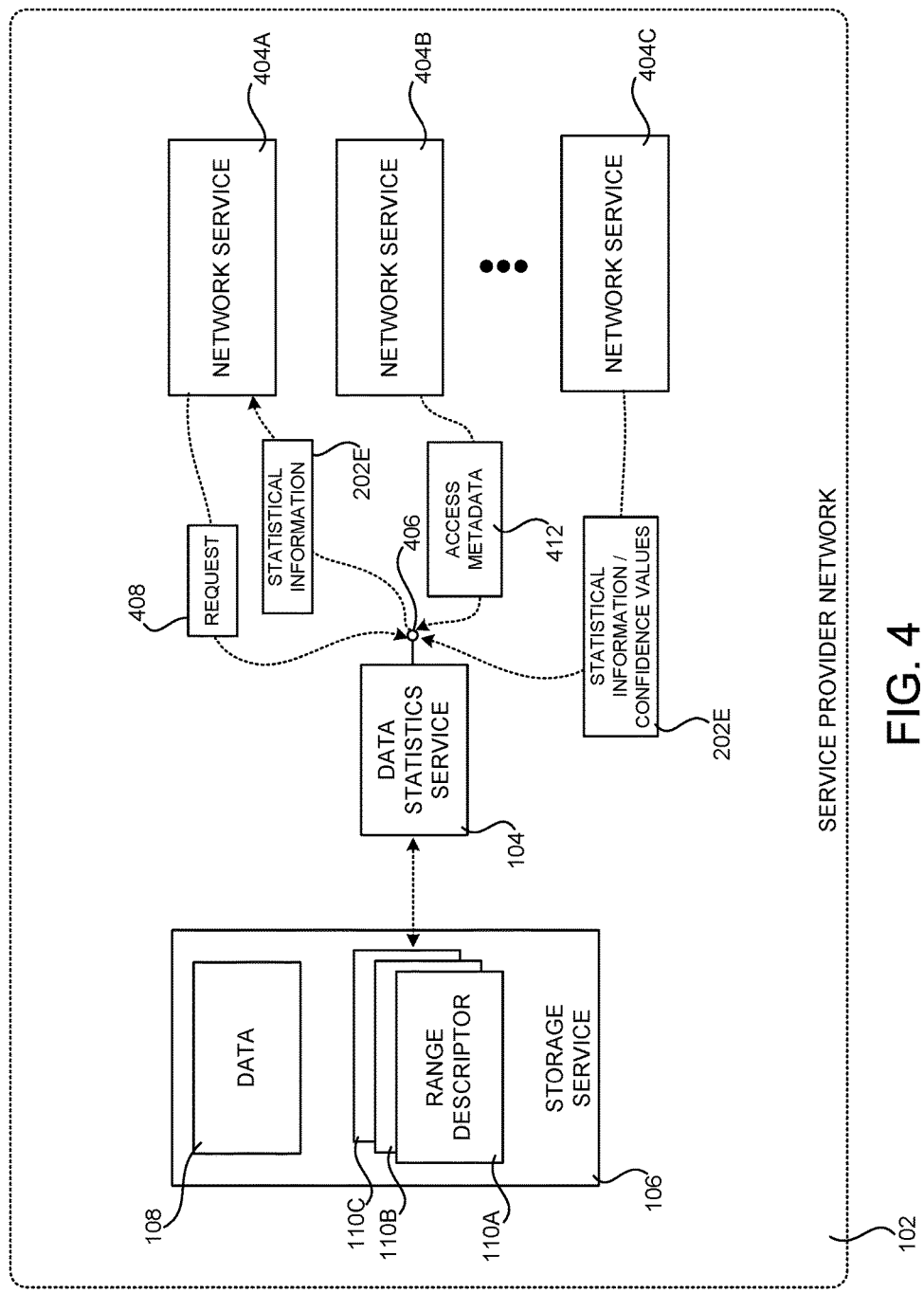
FIG. 4 is a system architecture diagram showing aspects of the configuration and operation of an application programming interface ("API") provided by the data statistics service in one configuration for providing access to statistical information, receiving statistical information generated by network services, and for modifying the processing performed by processing agents based upon access metadata.

FIG. 4 is a system architecture diagram showing aspects of the configuration and operation of a network service API 406 provided by the data statistics service 104 in one configuration for providing access to statistical information 202E, receiving statistical information 202E generated by network services 404, and for modifying the processing performed by the processing agents 112 based upon access metadata 412. As shown in FIG. 4, the data statistics service 104 can expose a network services API 406 in some configurations to expose various types of functionality to other network services 404A-404C executing in the service provider network. Details regarding aspects of this functionality are provided below.

In one configuration, the API 406 provides a method through which network services 404 can request and obtain the statistical information 202E stored in the range descriptors 110. For example, and without limitation, a network service 404A can transmit a request 408 to the API 408 for statistical information 202E for a set of the data 108. In turn, the data statistics service 104 can obtain the requested statistical information 202E from the appropriate range descriptor 110 and provide the statistical information 202E to the network service 404A in reply to the request. In order to satisfy such a request 408, the data statistics service 104 might be required to merge or split range descriptors 110. The information regarding the deleted rows and sortedness of a set of the data 108 can also be requested and provided to network services 404 in a similar manner.

As discussed briefly above, the network services 404 executing in the service provider network 102 can utilize the statistical information 202E for use in query optimization, compaction, and/or ordering of the data 108. For example, and without limitation, if a network service 404A wants to find transactions in the data 108 associated with 'John Smith', it does not have to load the stored data 108 if the data statistics service 104 can authoritatively say, based on the statistical information 202E stored in the range descriptors 110, that 'John Smith' is not present in the data 108. Other types of optimizations can also be performed based upon the statistical information 202E stored in the range descriptors 110.

The API 406 can also provide functionality for receiving statistical information 202E from a network service 404. For instance, in the example shown in FIG. 4, the network service 404C has computed statistical information 202E and associated confidence values for a set of the data 108. In response to receiving statistical information 202E from a network service, the data statistics service 104 can store the received statistical information 202E in the appropriate range descriptor 110. In this manner, the network services 404, in addition to the processing agents 112 can be utilized to update the contents of the range descriptors 110 for sets of the data 108.

The API 406 can also provide functionality for receiving access metadata 412 from a network service 404. For instance, in the example shown in FIG. 4, the network service 404 has provided the access metadata 412 to the API 406. The access metadata 412 describes the frequency of access to the data 108 or patterns of access to the data 108 observed by the network service 404 providing the access metadata 412.

The data statistics service 104 can utilize the access metadata 412 to instruct the processing agents 112 to focus their processing on certain sets of the data 108. For example, and without limitation, the data statistics service 104 can utilize the access metadata 412 to identify portions of the data 108 that need more accurate statistical analysis and focus the processing of the processing agents 112 on those portions. The access metadata 412 can be utilized in other ways in other configurations. Additional details regarding the operation of the API 406 will be provided below with regard to FIG. 5.

Figure 5:
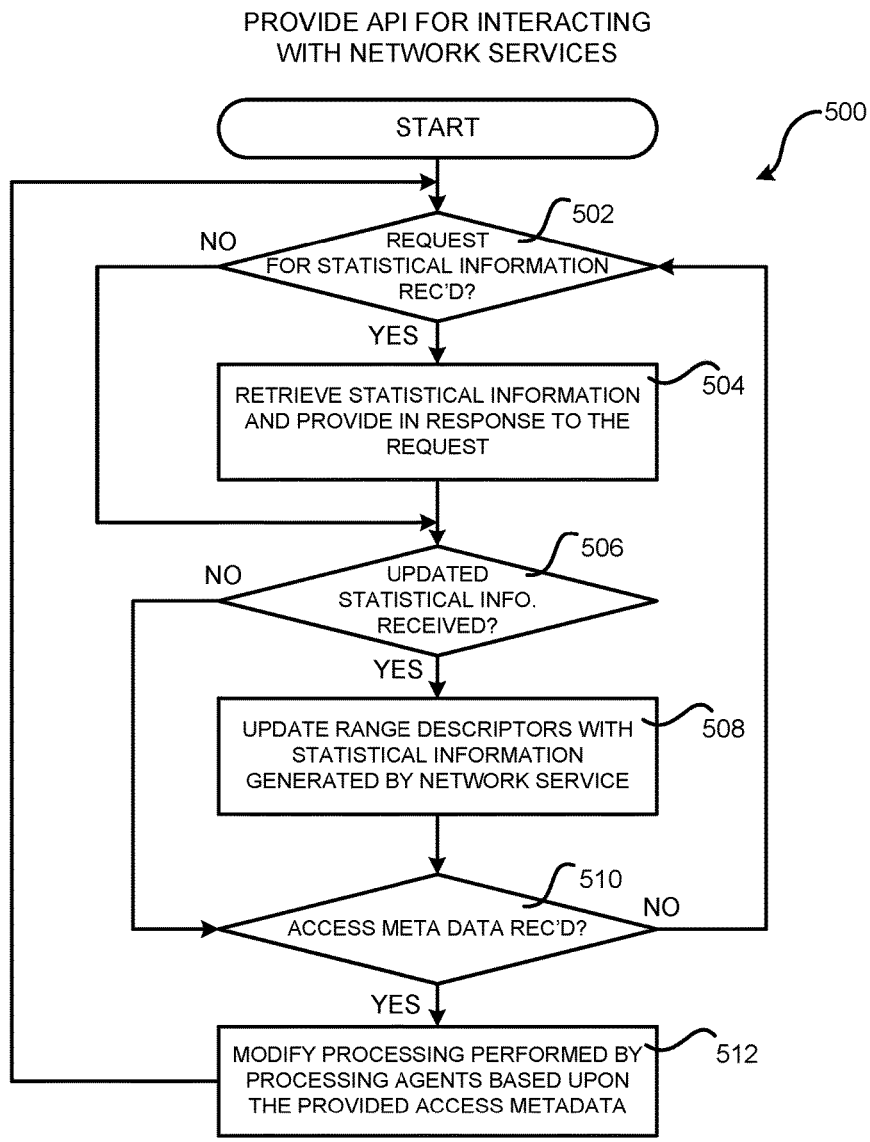
FIG. 5 is a flow diagram showing a routine that illustrates aspects of the API illustrated and described with regard to FIG. 4, according to one configuration disclosed herein.

FIG. 5 is a flow diagram showing a routine 500 that illustrates aspects of the API 406 illustrated and described with regard to FIG. 4, according to one configuration disclosed herein. The routine 500 begins at operation 502, where the data statistics service 104 determines whether a request 408 has been received from a network service 404 for statistical information 202E for a set, or sets, of the data 108. If so, the routine 500 proceeds from operation 502 to operation 504, where the data statistics service 104 retrieves the requested statistical information 202E from the appropriate range descriptor 110. As discussed above, it may be necessary to merge or split range descriptors 110 in order to provide the requested statistical information 202E for a particular set of the data 108. The requested statistical information 202E is then provided to the network service 404 that submitted the request 408.

From operation 504, the routine 500 proceeds to operation 506, where the data statistics service 104 determines whether a network service 404 has provided statistical information 202E. If so, the routine 500 proceeds from operation 506 to operation 508, where the appropriate range descriptor 110, or descriptors 110, is updated with the statistical information 202E generated by the network service 404 and provided via the API 406. The routine 500 then proceeds from operation 508 to operation 510.

At operation 510, the data statistics service 104 determines whether access metadata 412 has been received from a network service 404. If so, the routine 500 proceeds from operation 510 to operation 512, where the data statistics service 104 can modify the processing performed by the processing agents 112 based upon the provided access metadata 412. As mentioned above, for example, the data statistics service 104 can instruct the processing agents 112 to focus their processing on sets of the data 108 that are being frequently accessed. From operation 512, the routine 500 proceeds back to operation 502, described above.

Figure 6:
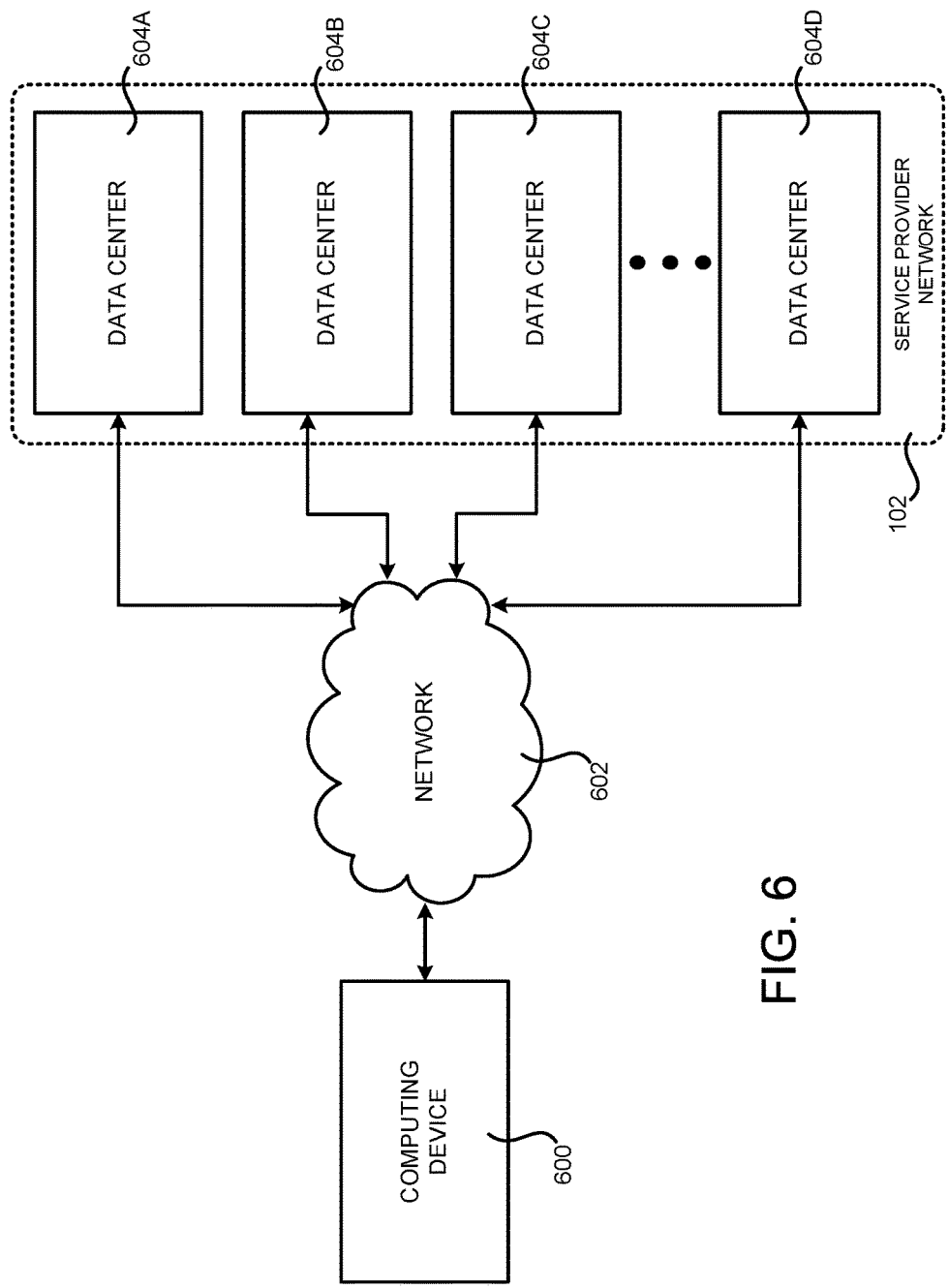
FIG. 6 is a system and network diagram that shows an illustrative operating environment that includes a service provider network that can be configured to implement aspects of the functionality described herein.

FIG. 6 is a system and network diagram that shows one illustrative operating environment for the configurations disclosed herein that includes a service provider network 102. As discussed above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including Web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

As also discussed above, the computing resources provided by the service provider network 102 are enabled in one implementation by one or more data centers 604A-604D (which might be referred herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 7.

The customers and other users of the service provider network 102 can access the computing resources provided by the service provider network 102 over a network 602, which can be a wide area communication network ("WAN"), such as the Internet, an intranet or an Internet service provider ("ISP") network or a combination of such networks. For example, and without limitation, a computing device 600 operated by a customer or other user of the service provider network 102 can be utilized to access the service provider network 102 by way of the network 602. It should be appreciated that a local-area network ("LAN"), the Internet, or any other networking topology known in the art that connects the data centers 604 to remote customers and other users can be utilized. It should also be appreciated that combinations of such networks can also be utilized.

Figure 7:
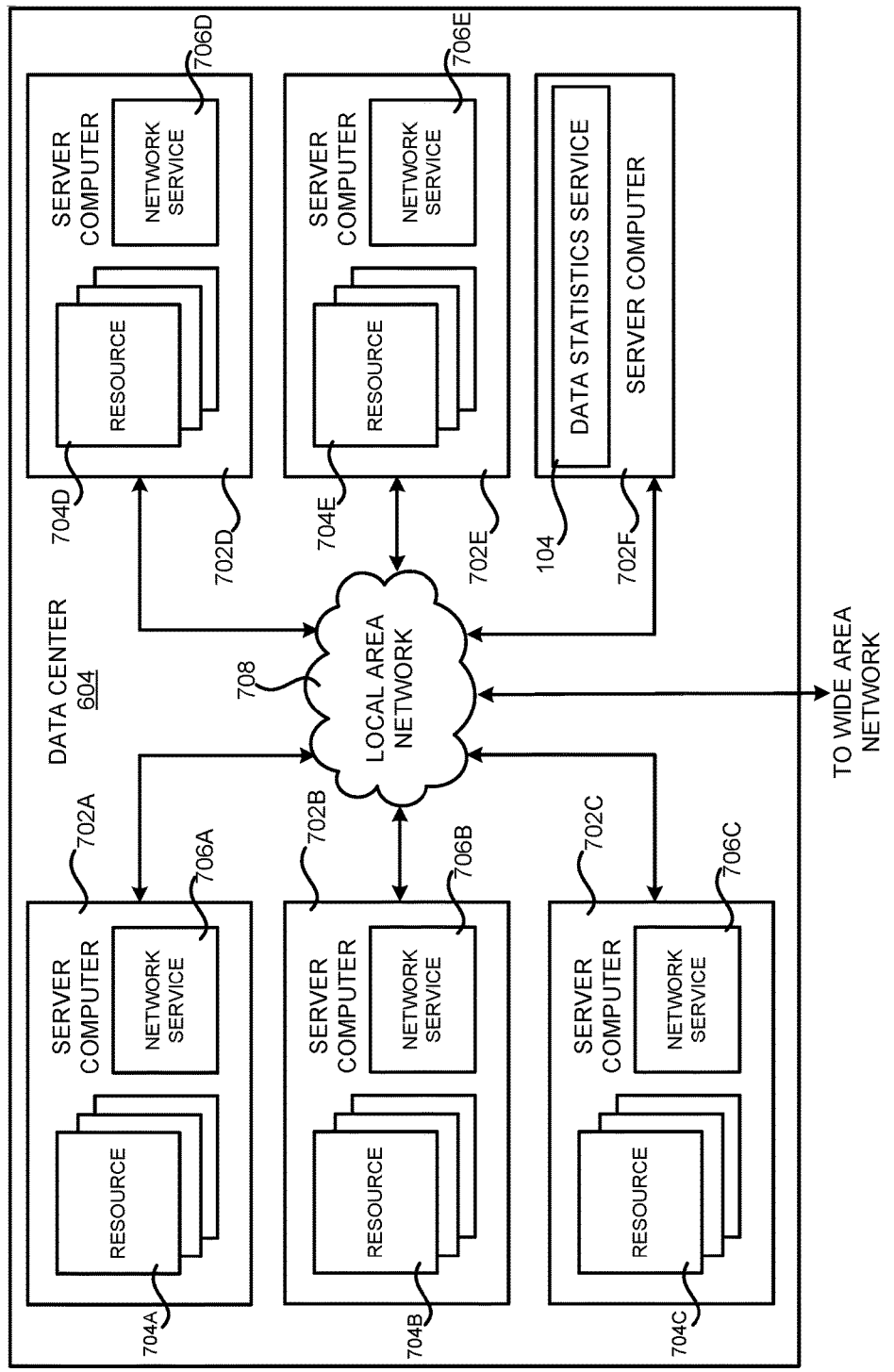
FIG. 7 is a computing system diagram illustrating a configuration for a data center that can be utilized to implement aspects of the technologies disclosed herein.

FIG. 7 is a computing system diagram that illustrates one configuration for a data center 604 that implements aspects of the technologies disclosed herein. The example data center 604 shown in FIG. 7 includes several server computers 702A-702F (which might be referred to herein singularly as "a server computer 702" or in the plural as "the server computers 702") for providing the computing resources 704A-704E.

The server computers 702 can be standard tower, rackmount, or blade server computers configured appropriately for providing the computing resources 704 described herein (illustrated in FIG. 7 as the computing resources 704A-704E). As mentioned above, the computing resources 704 provided by the service provider network 102 can be data processing resources such as VM instances or hardware computing systems, data storage resources, database resources, networking resources, and others. Some of the servers 702 can also be configured to execute network services 706A-706E, respectively, capable of instantiating, providing and/or managing the computing resources 704, some of which are described in detail below with regard to FIG. 8.

The data center 604 shown in FIG. 7 also includes a server computer 702F that can execute some or all of the software components described above. For example, and without limitation, the server computer 702F can be configured to execute the data statistics service 104, which was described in detail above. The server computer 702F can also be configured to execute other components and/or to store data for providing some or all of the functionality described herein. In this regard, it should be appreciated that the data statistics service 104 can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 604A-604D, between each of the server computers 702A-702F in each data center 604, and, potentially, between computing resources 704 in each of the data centers 604. It should be appreciated that the configuration of the data center 604 described with reference to FIG. 7 is merely illustrative and that other implementations can be utilized.

Figure 8:
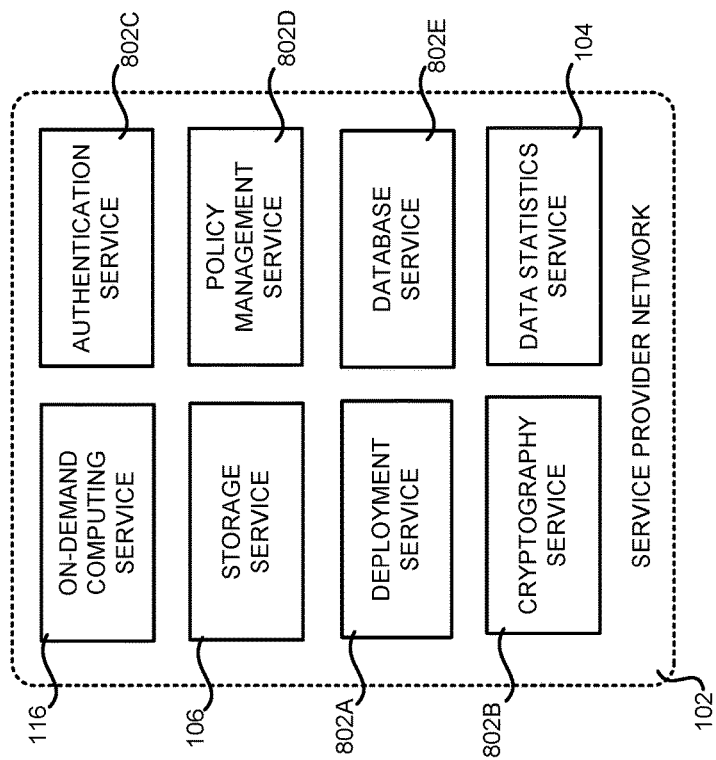
FIG. 8 is a network services diagram that shows aspects of several services that can be provided by and utilized within a service provider network configured to implement the various technologies disclosed herein.

FIG. 8 is a system and network diagram that shows aspects of several network services that can be provided by and utilized within the service provider network 102 in one configuration disclosed herein. In particular, and as discussed above, the service provider network 102 can provide a variety of network services to customers and other users of the service provider network 102 including, but not limited to, the data statistics service 104, the on-demand computing service 116, and the storage service 106. The service provider network 102 can also provide other types of services including, but not limited to, a deployment service 802A, a cryptography service 802B, an authentication service 802C, and/or a policy management service 802D, each of which is described in greater detail below. Additionally, the service provider network 102 can also provide other types of network services, some of which are also described in greater detail below.

It should be appreciated that customers of the service provider network 102 can include organizations or individuals that utilize some or all of the services provided by the service provider network 102. As described above, a customer or other user can communicate with the service provider network 102 through a network, such as the network 602 shown in FIG. 6. Communications from a customer computing device to the service provider network 102 can cause the services provided by the service provider network 102 to operate in accordance with the described configurations or variations thereof.

It is noted that not all configurations described include the services described with reference to FIG. 8 and that additional network services can be provided in addition to or as an alternative to the services explicitly described herein. Each of the services shown in FIG. 8 can also expose network service interfaces that enable a caller to submit appropriately configured application programming interface ("API") calls to the various services through network service requests. In addition, each of the services can include service interfaces that enable the services to access each other (e.g., to enable a virtual computer system provided by the on-demand computing service 116 to store data in or retrieve data from the data storage service 106). Additional details regarding some of the services shown in FIG. 8 will now be provided.

As discussed above, the on-demand computing service 116 can be a collection of computing resources configured to instantiate VM instances and to provide other types of computing resources 704 on demand. For example, a customer or other user of the service provider network 102 can interact with the on-demand computing service via appropriately configured and authenticated API calls to provision and operate VM instances that are instantiated on physical computing devices hosted and operated by the service provider network 102. The VM instances can be used for various purposes, such as to operate as servers supporting the network services described herein, a Web site, to operate business applications or, generally, to serve as computing resources for the customer. Other applications for the VM instances can be to support database applications, electronic commerce applications, business applications and/or other applications. Although the on-demand computing service 116 is shown in FIGS. 1 and 8, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The storage service 106 can include software and computing resources that collectively operate to store data using block or file-level storage devices (and/or virtualizations thereof). The storage devices of the storage service 106 can, for example, be operationally attached to virtual computer systems provided by the on-demand computing service 116 to serve as logical units (e.g., virtual drives) for the computer systems. A storage device can also enable the persistent storage of data used/generated by a corresponding virtual computer system where the virtual computer system service might only provide ephemeral data storage.

The service provider network 102 can also include a cryptography service 802B. The cryptography service 802B can utilize storage services of the service provider network 102, such as the storage service 106, to store encryption keys in encrypted form, whereby the keys can be usable to decrypt customer keys accessible only to particular devices of the cryptography service 802B. The cryptography service 802B can also provide other types of functionality not specifically mentioned herein.

As illustrated in FIG. 8, the service provider network 102, in various configurations, also includes an authentication service 802C and a policy management service 802D. The authentication service 802C, in one example, is a computer system (i.e., collection of computing resources 704) configured to perform operations involved in authentication of users. For instance, one of the services shown in FIG. 8 can provide information from a user to the authentication service 802C to receive information in return that indicates whether or not the requests submitted by the user are authentic.

The policy management service 802D, in one example, is a network service configured to manage policies on behalf of customers or internal users of the service provider network 102. The policy management service 802D can include an interface that enables customers to submit requests related to the management of policy. Such requests can, for instance, be requests to add, delete, change or otherwise modify policy for a customer, service, or system, or for other administrative actions, such as providing an inventory of existing policies and the like.

The service provider network 102 can additionally maintain other services based, at least in part, on the needs of its customers. For instance, the service provider network 102 can maintain a deployment service 802A for deploying program code and/or a database service 802E in some configurations. The database service 802E can be a collection of computing resources that collectively operate to create, maintain, and allow queries to be performed on databases stored within the service provider network 102. For example, a customer or other user of the service provider network 102 can operate and manage a database from the database service 802E by utilizing appropriately configured network API calls. This, in turn, can allow the customer to maintain and potentially scale the operations in the database. Other services include object-level archival data storage services, and services that manage, monitor, interact with, or support other services. The service provider network 102 can also be configured with other network services not specifically mentioned herein in other configurations.

Figure 9:
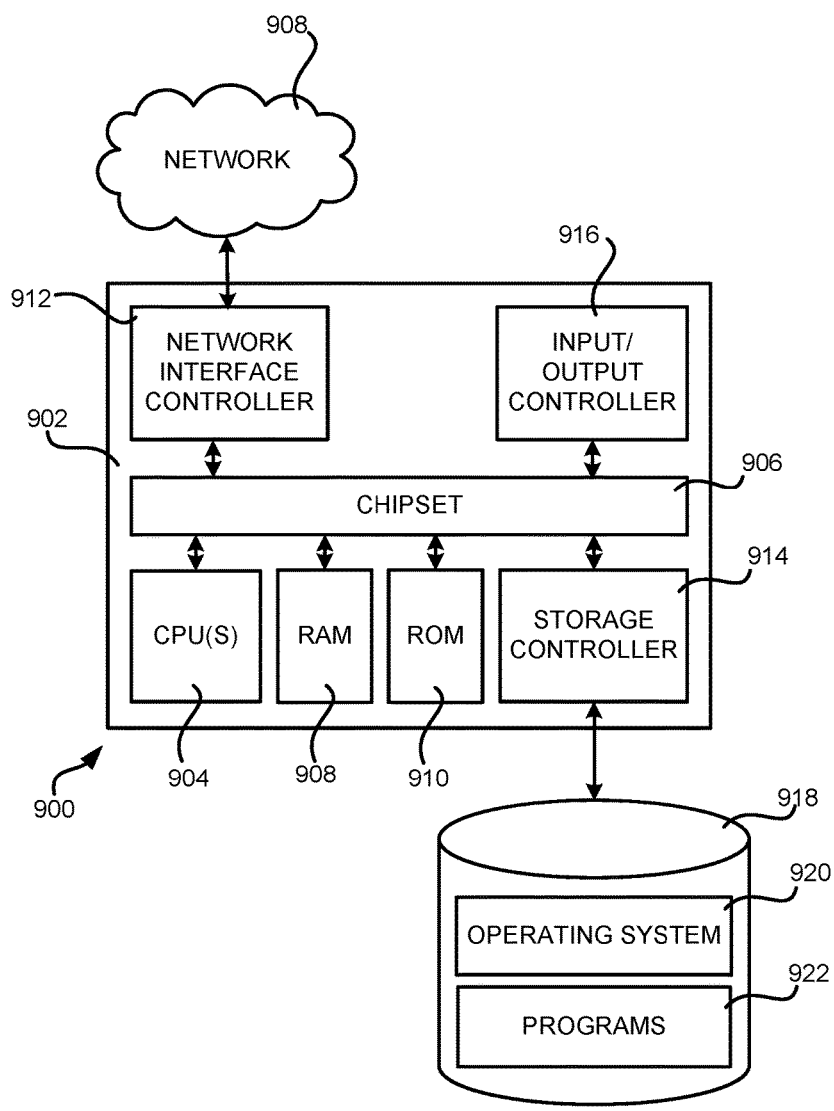
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates.

These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, programs 922, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to one configuration, the operating system comprises the LINUX operating system. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In one configuration, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above with regard to FIGS. 1-5. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or another type of output device. It will be appreciated that the computer 900 might not include all of the components shown in FIG. 9, can include other components that are not explicitly shown in FIG. 9, or might utilize an architecture completely different than that shown in FIG. 9.

Based on the foregoing, it should be appreciated that technologies for providing a data statistics service have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
   a processor; and
   a non-transitory computer-readable storage medium having instructions stored thereupon which are executable by the processor and which, when executed, cause the apparatus to:
      generate range descriptors for data stored by a storage service in a service provider network, the range descriptors defining sets of the data;
      provide the range descriptors to processing agents executing on virtual machine instances provided by an on-demand computing service in the service provider network;
      determine that the virtual machine instances have computing capacity for generating statistical information for the data;
      responsive to determining that the virtual machine instances have computing capacity for generating the statistical information for the data, instructing the processing agents to generate, based on availability of the computing capacity, the statistical information and associated confidence values for the sets of the data defined by the provided range descriptors, wherein the associated confidence values define a current degree of completion for the generating by the processing agents;
      expose an application programming interface (API) for providing the statistical information and the associated confidence values for the sets to a plurality of network services as a shared source for the statistical information, wherein the API is further configured to receive access metadata from one of the plurality of network services, the access metadata describing a frequency or pattern of access to the data observed by the one of the plurality of network services; and
      instruct the processing agents to process sets of the data based upon the access metadata.

2. The apparatus of claim 1, wherein the non-transitory computer-readable storage medium has further instructions stored thereupon to:
   determine, during generation of the statistical information by the processing agents, that the virtual machine instances are not to continue generating the statistical information for the data; and
   instruct the processing agents to stop generating the statistical information for the data responsive to determining that the virtual machine instances are not to continue generating the statistical information.

3. The apparatus of claim 1, wherein the API is further configured to receive additional statistical information and an associated confidence value generated by one of the plurality of network services, and wherein the non-transitory computer-readable storage medium has further instructions stored thereupon to update the range descriptors using the additional statistical information and the associated confidence value generated by the one of the plurality of network services.

4. The apparatus of claim 1, wherein the statistical information comprises one or more of minimum or maximum values within a set of the data, a histogram for a set of the data, a Bloom filter for a set of the data, a Count Distinct for a set of the data, a HyperLogLog for a set of the data, a median of a set of the data, a mean of a set of the data, a standard deviation of a set of the data, and a higher order moment of a set of the data.

5. A computer-implemented method, comprising:
   providing range descriptors to processing agents executing in a service provider network, the range descriptors defining sets of data stored by a storage service in the service provider network;
   determining that computing capacity is available from an on-demand computing service operating within a service provider network for generating statistical information for the sets of the data;
   responsive to determining that computing capacity is available from the on-demand computing service for generating the statistical information for the sets of the data, instructing the processing agents to generate, based on availability of the computing capacity, the statistical information and associated confidence values for the sets of the data defined by the provided range descriptors, wherein the associated confidence values define a current degree of completion for the generating by the processing agents;
   providing the statistical information and the associated confidence values for the sets of the data to a plurality of network services executing in the service provider network as a shared source for the statistical information by way of an application programming interface (API), wherein the API is further configured to receive access metadata from one of the plurality of network services, the access metadata describing a frequency or pattern of access to the data observed by the one of the plurality of network services; and
   instructing the processing agents to process sets of the data based upon the access metadata.

6. The computer-implemented method of claim 5, further comprising:
   determining, during generation of the statistical information by the processing agents, that the computing capacity is not available from the on-demand computing service for generating the statistical information for the data; and
   instructing the processing agents to stop generating the statistical information for the data responsive to determining that the computing capacity is not available from the on-demand computing service for generating the statistical information.

7. The computer-implemented method of claim 5, further comprising:
   receiving additional statistical information and an associated confidence value generated by the at least one network service by way of the API; and
   updating the range descriptors using the additional statistical information and the associated confidence value generated by the at least one network service and received from the at least one network service by way of the API.

8. The computer-implemented method of claim 5, wherein the statistical information comprises one or more of minimum or maximum values within a set of the data, a histogram for a set of the data, a Bloom filter for a set of the data, a Count Distinct for a set of the data, a HyperLogLog for a set of the data, a median of a set of the data, a mean of a set of the data, a standard deviation of a set of the data, and a higher order moment of a set of the data.

9. The computer-implemented method of claim 5, wherein the range descriptors comprise the statistical information and the associated confidence values.

10. The computer-implemented method of claim 5, wherein the range descriptors comprise data defining a set of the data.

11. The computer-implemented method of claim 5, wherein the range descriptors comprise data defining a number of deleted rows in a set of the data and an associated confidence value.

12. The computer-implemented method of claim 5, wherein the range descriptors comprise data defining a sortedness of a set of the data and an associated confidence value.

13. A non-transitory computer-readable storage medium having instructions stored thereupon which are executable by a processor and which, when executed, cause the processor to:
provide range descriptors to processing agents executing in a service provider network, the range descriptors defining sets of data stored by a storage service in the service provider network;
determine that computing capacity is available from computing resources provided by an on-demand computing service operating within a service provider network for generating statistical information for the sets of the data;
responsive to determining that computing capacity is available from computing resources provided by the on-demand computing service for generating the statistical information for the data, instructing the processing agents to generate, based on availability of the computing capacity, the statistical information and associated confidence values for the sets of the data defined by the provided range descriptors, wherein the associated confidence values define a current degree of completion for the generating by the processing agents;
provide the statistical information and the associated confidence values for the sets of the data to a plurality of network services executing in the service provider network by way of an application programming interface (API) as a shared source for the statistical information wherein the API is further configured to receive access metadata from one of the plurality of network services, the access metadata describing a frequency or pattern of access to the data observed by the one of the plurality of network services; and
instruct the processing agents to process sets of the data based upon the access metadata.

14. The non-transitory computer-readable storage medium of claim 13, having further instructions stored thereupon to:
receive additional statistical information and an associated confidence value generated by the at least one network service by way of the API; and
update the range descriptors using the additional statistical information and the associated confidence value generated by the at least one network service and received from the at least one network service by way of the API.

15. The non-transitory computer-readable storage medium of claim 13, having further instructions stored thereupon to:
determine, during generation of the statistical information by the processing agents, that computing capacity is not available from computing resources provided by the on-demand computing service for generating the statistical information for the data; and
instruct the processing agents to stop generating the statistical information for the data responsive to determining that computing capacity is not available for generating the statistical information.

16. The non-transitory computer-readable storage medium of claim 13, wherein the statistical information comprises one or more of minimum or maximum values within a set of the data, a histogram for a set of the data, a Bloom filter for a set of the data, a Count Distinct for a set of the data, a HyperLogLog for a set of the data, a median of a set of the data, a mean of a set of the data, a standard deviation of a set of the data, or a higher order moment of a set of the data.

17. The non-transitory computer-readable storage medium of claim 13, wherein the range descriptors comprise the statistical information and the associated confidence values, data defining a set of the data, and data defining a sortedness of the data and an associated confidence value.

* * * * *